(12) United States Patent
Willgert et al.

(10) Patent No.: US 11,495,840 B2
(45) Date of Patent: Nov. 8, 2022

(54) APPARATUS FOR PROVIDING BATTERY PACK COOLING

(71) Applicant: HUSQVARNA AB, Huskvarna (SE)

(72) Inventors: Mikael Willgert, Spånga (SE); Lars Dernebo, Ödeshög (SE); Martin Larsén, Jönköping (SE); Rajinder Mehra, Johanneshov (SE)

(73) Assignee: HUSQVARNA AB, Huskvarna (SE)

( * ) Notice: Subject to any disclaimer, the term of this patent is extended or adjusted under 35 U.S.C. 154(b) by 367 days.

(21) Appl. No.: 14/646,818

(22) PCT Filed: Nov. 23, 2012

(86) PCT No.: PCT/EP2012/073445
§ 371 (c)(1),
(2) Date: May 22, 2015

(87) PCT Pub. No.: WO2014/079507
PCT Pub. Date: May 30, 2014

(65) Prior Publication Data
US 2015/0303531 A1     Oct. 22, 2015

(51) Int. Cl.
*H02J 7/00*        (2006.01)
*H01M 10/46*   (2006.01)
(Continued)

(52) U.S. Cl.
CPC ........... *H01M 10/46* (2013.01); *H01M 10/44* (2013.01); *H01M 10/643* (2015.04);
(Continued)

(58) Field of Classification Search
CPC .................................................... H01M 10/46
See application file for complete search history.

(56) References Cited

U.S. PATENT DOCUMENTS

| 7,867,663 B2 | 1/2011 | Park et al. | |
| 2002/0034682 A1* | 3/2002 | Moores, Jr. | H01M 2/1022 |
| | | | 429/120 |

(Continued)

FOREIGN PATENT DOCUMENTS

| EP | 1 100 173 A2 | 5/2001 | |
| EP | 2187473 A1 * | 5/2010 | .......... H01M 10/625 |

(Continued)

OTHER PUBLICATIONS

Dong Hyup Jeon, Numerical modeling of lithium ion battery for predicting thermal behavior in a cylindrical cell, Feb. 2014, Current Applied Physics, vol. 14, Issue 2, pp. 196-205 (Year: 2014).*

(Continued)

*Primary Examiner* — Brian R Ohara
(74) *Attorney, Agent, or Firm* — Burr & Forman LLP

(57) ABSTRACT

A battery pack may include a plurality of battery cells, a cell retainer and a heat exchanger assembly. The cell retainer may define a plurality of cell reception slots configured to retain respective ones of the battery cells. The cell retainer may define an enclosure that fixes the battery cells and is not penetrated by any cooling apparatus. The cell retainer may be in thermal communication with the battery cells to transfer heat away from the battery cells. The heat exchanger assembly may be in thermal communication with the cell retainer and external to the cell retainer to at least passively transfer heat away from the cell retainer while the battery pack is operated in a discharge mode. The cell retainer may include a thermally conductive material capable of transferring heat to the heat exchanger assembly and also storing at least some of the heat.

19 Claims, 8 Drawing Sheets

(51) Int. Cl.
- *H01M 10/643* (2014.01)
- *H01M 10/6551* (2014.01)
- *H01M 10/6557* (2014.01)
- *H01M 10/6563* (2014.01)
- *H01M 10/659* (2014.01)
- *H01M 50/213* (2021.01)
- *H01M 10/44* (2006.01)
- *H01M 10/6555* (2014.01)

(52) U.S. Cl.
CPC ..... *H01M 10/659* (2015.04); *H01M 10/6551* (2015.04); *H01M 10/6555* (2015.04); *H01M 10/6557* (2015.04); *H01M 10/6563* (2015.04); *H01M 50/213* (2021.01); *H02J 7/0029* (2013.01); *H02J 7/0045* (2013.01)

(56) References Cited

U.S. PATENT DOCUMENTS

| | | | |
|---|---|---|---|
| 2003/0186114 A1* | 10/2003 | Lohr | H01M 2/105 429/96 |
| 2005/0202310 A1* | 9/2005 | Yahnker | H01M 2/105 429/62 |
| 2005/0255379 A1 | 11/2005 | Marchio et al. | |
| 2009/0104516 A1* | 4/2009 | Yoshihara | H01M 2/105 429/149 |
| 2010/0231419 A1 | 11/2010 | Zhou | |
| 2011/0135993 A1* | 6/2011 | An | H01M 2/1077 429/156 |
| 2011/0183176 A1 | 7/2011 | Schwab et al. | |
| 2014/0210413 A1 | 7/2014 | Yoon et al. | |

FOREIGN PATENT DOCUMENTS

| | | |
|---|---|---|
| EP | 2447966 A1 | 5/2012 |
| JP | 2002373708 A | 12/2002 |
| WO | 2015/075914 A1 | 5/2015 |

OTHER PUBLICATIONS

Definitions14646818 (Year: 2020).*
International Search Report and Written Opinion for International Application No. PCT/EP2012/073445 dated Jun. 6, 2013.
International Preliminary Report on Patentability for International Application No. PCT/EP2012/073445 dated May 26, 2015.
International Search Report and Written Opinion for International Application No. PCT/US2017/064911 dated Jul. 23, 2018.

* cited by examiner

APPARATUS FOR PROVIDING BATTERY PACK COOLING

TECHNICAL FIELD

Example embodiments generally relate to battery pack technology and, more particularly, relate to mechanisms for cooling cells within a battery pack.

BACKGROUND

Property maintenance tasks are commonly performed using various tools and/or machines that are configured for the performance of corresponding specific tasks. Certain tasks, like cutting trees, trimming vegetation, blowing debris and the like, are typically performed by hand-held tools or power equipment. The hand-held power equipment may often be powered by gas or electric motors. Until the advent of battery powered electric tools, gas powered motors were often preferred by operators that desired, or required, a great deal of mobility. Accordingly, many walk-behind or ride-on outdoor power equipment devices, such as lawn mowers, are often powered by gas motors because they are typically required to operate over a relatively large range. However, as battery technology continues to improve, the robustness of battery powered equipment has also improved and such devices have increased in popularity.

The batteries employed in hand-held power equipment may, in some cases, be removable and/or rechargeable assemblies of a plurality of smaller cells that are arranged together in series and/or parallel arrangements in order to achieve desired output characteristics. However, when these cells are arranged together to form battery packs, it is important to consider that the battery packs can sometimes be operated in harsh or at least relatively uncontrolled conditions. Exposure to extreme temperatures, dust/debris, moisture and other conditions can present challenges for maintaining performance and/or integrity of battery packs.

To increase the robustness of battery packs that can be used in relatively inhospitable environments, it may be advantageous to provide a seal around the cells of the battery pack to limit their exposure to the environment. Battery cells generate electricity via electrochemical reactions that may generate heat. Thus, sealing of battery packs, while useful in preventing exposure to some harsh conditions, may cause cell heat to be contained so that it builds up and is difficult to dissipate effectively. This may inadvertently create high internal temperatures that could damage cells or negatively impact cell performance.

BRIEF SUMMARY OF SOME EXAMPLES

Some example embodiments may provide a battery pack that has a cell retainer that is designed to enable effective cooling without the use of active cooling internal to the cell retainer. Thus, for example, some embodiments may provide a cell retainer structure that can accumulate heat dissipated from the cells of the battery pack and also transport such heat to an external heat exchanger. The external heat exchanger may be embodied as or otherwise be in communication with an active or passive cooling source. However, in any case, the active or passive cooling source of some embodiments may provide the cooling external to the cell retainer structure so that the cells and the internal portions of the cell retainer structure are not exposed to the environment or any cooling fluids that may carry contaminants into proximity of the cells during operation including discharge or charging. The operating life of battery packs employing example embodiments may therefore be increased and the overall performance of such a battery pack may be improved.

In one example embodiment, a battery pack is provided. The battery pack may include a plurality of battery cells, a cell retainer and a heat exchanger assembly. The cell retainer may define a plurality of cell reception slots configured to retain respective ones of the battery cells. The cell retainer may define an enclosure that fixes the battery cells and is not penetrated by any cooling apparatus. The cell retainer may be in thermal communication with the battery cells to transfer heat away from the battery cells. The heat exchanger assembly may be in thermal communication with the cell retainer and external to the cell retainer to at least passively transfer heat away from the cell retainer while the battery pack is operated in a discharge mode. The cell retainer may include a thermally conductive material capable of transferring heat to the heat exchanger assembly and also storing at least some of the heat.

In another example embodiment, a battery pack charging system is provided. The battery pack charging system may include a battery charger, and a battery pack that is receivable into the battery charger for charging of the battery pack. The battery pack may include a plurality of battery cells, a cell retainer and a heat exchanger assembly. The cell retainer may define a plurality of cell reception slots configured to retain respective ones of the battery cells. The cell retainer may define an enclosure that fixes the battery cells and is not penetrated by any cooling apparatus. The cell retainer may be in thermal communication with the battery cells to transfer heat away from the battery cells. The heat exchanger assembly may be in thermal communication with the cell retainer and external to the cell retainer to at least passively transfer heat away from the cell retainer while the battery pack is operated in a discharge mode. The cell retainer may include a thermally conductive material capable of transferring heat to the heat exchanger assembly and also storing at least some of the heat.

In another example embodiment, a method of cooling a battery pack is provided. The method may include providing a cell retainer defining a plurality of cell reception slots configured to retain respective ones of a plurality of battery cells. The cell retainer may be in thermal communication with the battery cells and may define an enclosure that fixes the battery cells and is not penetrated by any cooling apparatus. The cell retainer may include a thermally conductive material capable of transferring heat to the heat exchanger assembly and also storing at least some of the heat. In an example embodiment, the method may further include providing a heat exchanger assembly in thermal communication with and external to the cell retainer to at least passively transfer heat away from the cell retainer while the battery pack is operated in a discharge mode.

Some example embodiments may improve the performance and/or the efficacy of battery packs that are used in connection with battery powered equipment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
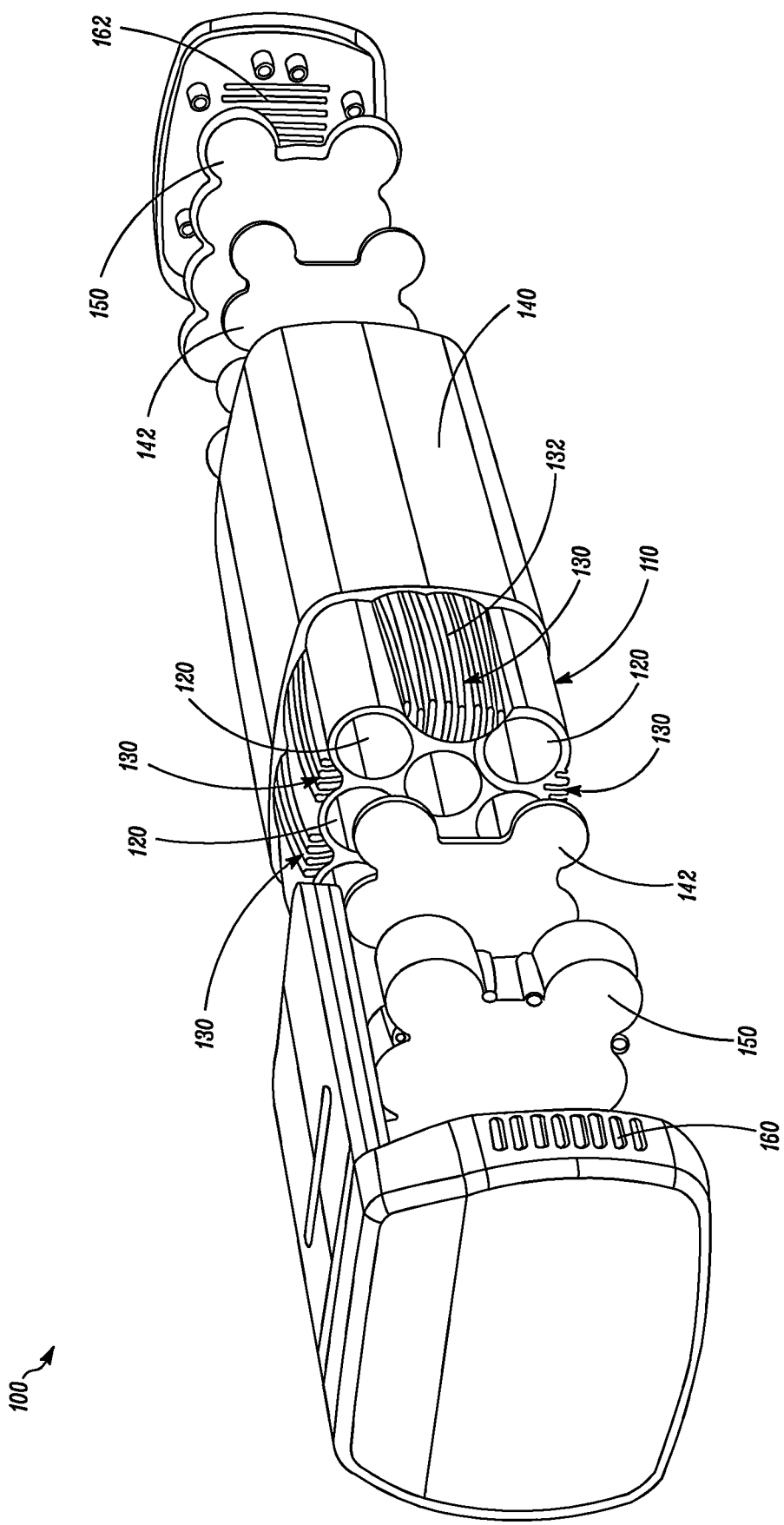
FIG. 1 illustrates an exploded perspective view of a battery pack according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. It should also be appreciated that some example embodiments may be scaled for use with any desirable number of battery cells. Thus, any illustration or suggestion as to the number of battery cells in any particular example embodiment described herein should be appreciated as a non-limiting example.

Some example embodiments may provide for a battery pack that can be useful in connection with battery powered tools or battery powered outdoor power equipment. Outdoor power equipment that is battery powered, and battery powered tools, typically include battery packs that include a plurality of individual cells. In order to achieve sufficient power, cells are organized and interconnected (e.g., in a series of series and/or parallel connections) to group the cells within a battery pack in a manner that achieves desired characteristics. The battery pack may be inserted into an aperture of the piece of equipment it powers so that the corresponding piece of equipment (e.g., hand-held, ride-on, or walk-behind equipment) is enabled to be mobile. However, in some cases, the battery pack may be inserted into a backpack or other carrying implement that the equipment operator may wear.

The cells of the battery pack are often rechargeable, cylindrical shaped cells. However, cells with other shapes, and even replaceable batteries could alternatively be employed in other embodiments. Given that the batteries produce energy via electrochemical reactions that generate heat, the battery pack may tend to heat up during charging or discharging operations. In particular, when the equipment operated by the battery pack is working hard, the discharge rates may be high. Similarly, when the battery pack is being charged, the rate of charging may impact heat generation. In this regard, for example, if the battery pack is to be charged quickly, and therefore have a relatively high rate of charge, the battery pack may generate a relatively large amount of heat.

High capacity cells also tend to have high internal resistances. Accordingly, since power is equal to the square of current times resistance, it is clear that a high charge or discharge rate will cause high power dissipation, and therefore high temperatures. However, even in low or moderate capacity cells, when the cells are employed in a manner that attempts to maximize the energy extraction from the cells over a given period of time, there will also be temperature issues. Given that cells are typically designed to operate within defined temperature ranges (e.g., $-10°$ C. to $+65°$ C.), temperature increases should be maintained at relatively low levels. If heat generation is excessive, temperatures may reach extreme levels at which cell damage may occur. Moreover, repeated exposure to high temperatures and/or high temperature variations may reduce the useful life of a battery pack.

A battery pack that is used in connection with outdoor power equipment is typically expected to provide significant amounts of power for operation of the corresponding equipment, and the power may need to be delivered continuously for extended periods of time. Furthermore, given that operators typically desire to have minimal downtime while waiting for a battery pack to recharge, it is often desirable to provide relatively high charging rates. Thus, it is clear that battery packs used for outdoor power equipment may encounter relatively high discharge and charging rates.

In many situations, the cells are held in place by a cell retainer. In some cases active cooling of the cells may be undertaken by forcing a cooling fluid (e.g., air) through the cell retainer (e.g., with a fan or pump) to carry heat away from the cells. This cooling may be provided during either or both of charging and discharging operations. However, the provision of such active cooling internal to the cell retainer may generate noise that is distracting to users. Moreover, active cooling internal to the cell retainer typically also requires inlet and outlet vents or louvers to provide airflow paths through the cell retainer. These vents or louvers are also potential entry points for water, lubricants, dirt and debris to enter into the cell retainer and foul surfaces therein. Increased potential for corrosion and decreased cell life are therefore encountered when such active cooling is employed.

Accordingly, some example embodiments may provide for a cell retainer structure that does not employ active internal cooling. Instead, some embodiments may provide a cell retainer (or fixation) structure that is configured to accumulate heat dissipated from the cells of the battery pack and transport such heat to an external heat exchanger. The external heat exchanger may be embodied as or otherwise be in communication with an active or passive cooling source. However, in any case, the active or passive cooling source of some embodiments may provide the cooling external to the cell retainer structure so that the cells and the internal portions of the cell retainer structure are not exposed to the environment or any cooling fluids that may carry contaminants into proximity of the cells during operation including discharge or charging.

Some embodiments may also provide for active cooling external to the cell retainer structure. The active cooling may be provided by a fan that generates cooling airflow over the external heat exchanger and/or over the outside or cover of the cell retainer structure. In some embodiments, the active cooling may be provided within an enclosure (e.g., an enclosure of the device that the battery pack powers or an enclosure of the charging apparatus). However, in other embodiments, the active cooling may be provided by a fan that merely directs air along the sides of the battery pack without specific structures being proximate to the sides of the battery pack for directing the air.

Accordingly, some embodiments may provide for mechanisms of cooling a battery cell without exposing the interior of the cell to outside air or environmental conditions while still enabling heat to be effectively carried away from the cells. This may prevent excessively high temperatures that could cause thermal damage to cells or lead to thermal runaway. Better cell cooling may also cause cells to age more slowly and to lose their charge capacities more slowly. Prevention of overheating may also improve the operator experience since high temperature protective shutdowns of equipment may be avoided.

Figure 2:
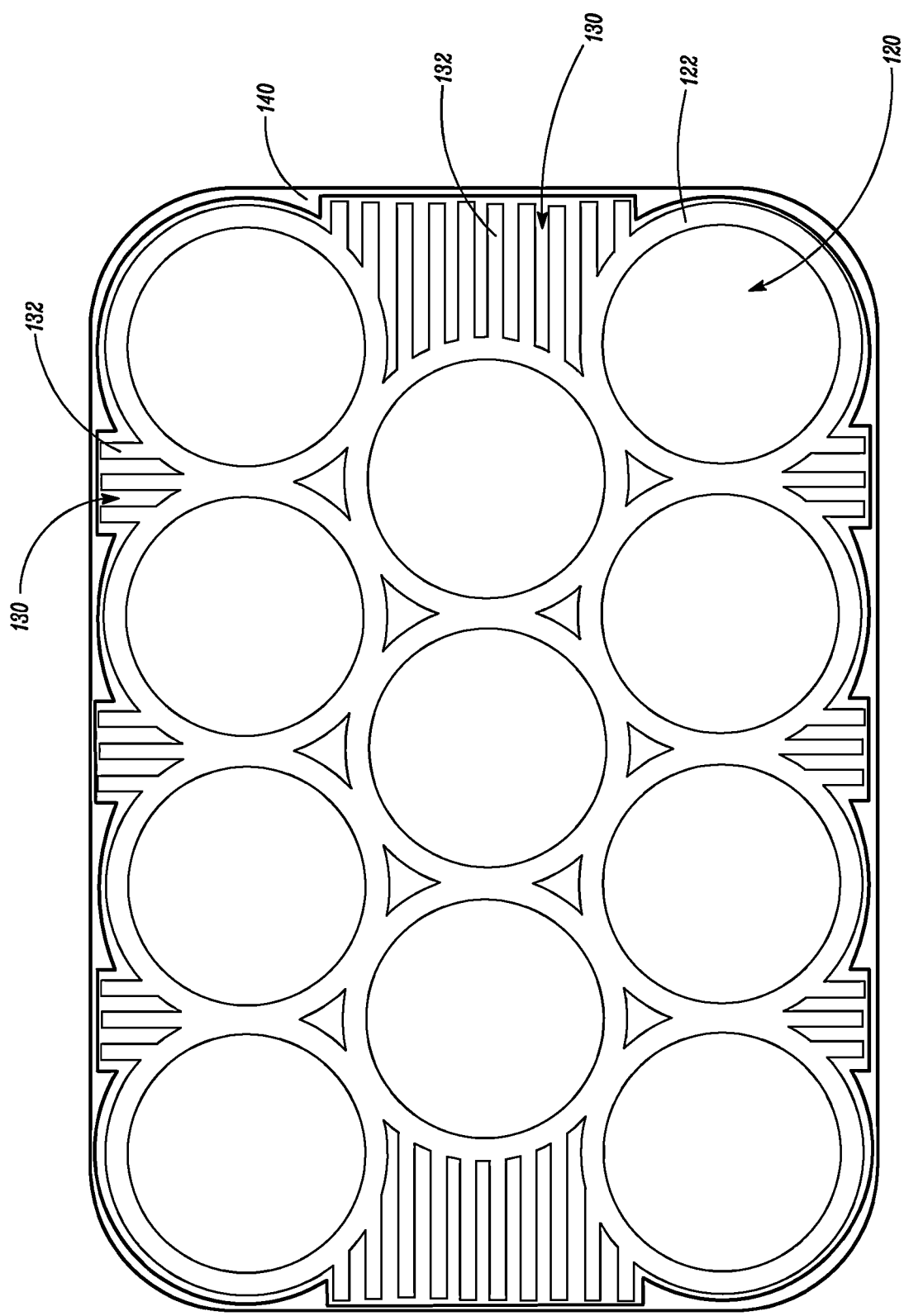
FIG. 2 illustrates a top view of portions of the battery pack to illustrate an example embodiment.

FIG. 1 illustrates an exploded perspective view of a battery pack according to an example embodiment. In this regard, FIG. 1 illustrates an embodiment of a battery pack 100 that includes a cell retainer 110 configured to house a plurality of battery cells (not shown). FIG. 2 illustrates a top view of portions of the battery pack to illustrate an example embodiment. As can be appreciated from FIGS. 1 and 2, the battery cells may be cylindrically shaped cells that are inserted into the cell reception slots 120 disposed in the cell retainer 110. The cell reception slots 120 may be sized such that the sidewalls 122 that define the cell reception slots 120 contact corresponding sidewalls of the battery cells. Accordingly, the cell reception slots 120 may be hollow cylindrical receptors that extend longitudinally substantially along an entirety of the sidewalls of the battery cells. Moreover, the cell retainer 110 may include all of the sidewalls 122 that define the cell reception slots 120 and any additional material provided between adjacent sidewalls 122. Thus, a periphery of the cell retainer 110 may be defined by the outer portions of sidewalls that have exposed edges.

The cell retainer 110 may be formed of a thermally conductive material that enables heat generated at the cells to be transferred via the cell retainer 110 away from the cells and to a heat exchanger assembly 130. For example, aluminum, thermally conductive plastics and/or the like may be used to form the cell retainer 110. In an example embodiment, the material of the cell retainer 110 may be selected such that the material is capable of transferring heat away from the battery cells during both discharge and charging operations. In some cases, forced cooling flow may only be provided during charging operations. Thus, for example, the maximum heat load expected to be generated during discharge operations must be able to be handled by the cell retainer 110 without assistance of forced air flow for cooling. In some embodiments, the cell retainer 110 may therefore also be designed to be enabled to accumulate some thermal energy and hold the energy within the mass of the cell retainer 110 during discharge, while some of the thermal energy is dissipated to the environment via the heat exchanger assembly 130. Accordingly, the material of the cell retainer 110 of some embodiments may be selected such that the material has a capacity for heat storage and heat transfer that is suitable for accumulating at least some of the thermal energy within the mass of the cell retainer 110 during discharge operation, but is also efficient with respect to transferring thermal energy to the heat exchanger assembly 130 when active cooling is available. In some embodiments, the mass of the cell retainer 110 may be selected (e.g., based on the heat storing capacity of the material used) to be sufficient to store excess heat that cannot be expelled to the environment via passive cooling during the maximum rated discharge of the battery pack 100.

The heat exchanger assembly 130 may be a structure that is external to the cell retainer 110 for taking heat away from the battery cells (or the cell reception slots 120) and therefore also away from the cell retainer 110. The heat exchanger assembly 130 may then be used to transfer the heat that is taken away from the battery cells to the environment or to other components that may transfer heat to the environment. For example, in some embodiments, the heat exchanger assembly 130 may transfer thermal energy (i.e., heat) generated by the battery cells and transferred to the heat exchanger assembly 130 by the cell retainer 110 to a cover 140 and/or to air or other fluid (forced or ambient) that is located within spaces or channels defined in the heat exchanger assembly 130. If the cover 140 is employed, the cover 140 may then transfer the thermal energy to the environment or to cooling air that passes proximate thereto.

In an example embodiment, the heat exchanger assembly 130 is formed of a plurality of fins 132 that extend from or otherwise contact portions of the periphery of the cell retainer 110. In the pictured example of FIGS. 1 and 2, the fins 132 are physically conjoined with the cell retainer 110 into a single unitary structure. However, in some alternatives, the heat exchanger assembly 130 may be a separate structure that is capable of being operably coupled with the cell retainer 110 to remove heat therefrom. In other words, the fins 132 may not necessarily be affixed to the periphery of the cell retainer 110, but may instead simply be placed into contact with the cell retainer 110. As an example, the fins 132 of the heat exchanger assembly 130 may extend inwardly from the cover 140 to contact the periphery of the cell retainer 110 to carry heat away from the cell retainer 110. Thus, for example, in some cases, the cover 140 may function as a portion of the heat exchanger assembly 130 to transfer heat generated by the battery cells and transmitted through the cell retainer 110 and the fins 132 to the cover 140 to the environment (e.g., to air external to the cover 140 and proximate to a surface thereof).

As shown in FIGS. 1 and 2, void spaces or channels may be formed between the fins 132 of the heat exchanger assembly 130. Ambient air or air that is forced through the void spaces or channels may remove heat from the heat exchanger assembly 130 in some cases. Thus, for example, the air in the channels may move out of the channels via convection that occurs naturally or as a result of forced flow initiated by a fan, pump or other fluid moving device.

In an example embodiment, the heat exchanger assembly 130 may define a path or channel where the direction of airflow through a cell retainer 110 of the battery pack 100 proceeds in a single direction along the side of cells within the cell retainer 110 when the battery pack 100 is being charged. As such, for example, the cells may be disposed such that their longitudinal axes are parallel to each other while cooling air flow extends in a direction parallel to the longitudinal axes of the cells (and the cell reception slots 120). However, the cooling air flow is not provided within the cell retainer 110, but is instead only allowed to flow external to the cell retainer 110 (e.g., along outside sidewalls 122 forming the periphery of the cell retainer 110). The fins 132, along with the cover 140 in some cases, may increase the cross sectional area of the heat transfer surface of the heat exchanger assembly 130 for transferring heat from the cells to the air traveling through the airflow channels defined between the fins 132. However, it should be appreciated that some other embodiments may not necessarily employ fins 132 as part of the heat exchanger assembly 130.

The battery pack 100 of FIG. 1 further includes electrodes 142 and electrode covers 150. However, as can be seen in FIG. 1, the electrodes 142 and the electrode covers 150 leave the airflow channels of the heat exchanger assembly 130 exposed so that cooling air is not blocked. Accordingly, air may move from intake vents 160 at one end of the battery pack 100 to discharge vents 162 disposed at an opposite end of the battery pack 100. (Of note, the direction of airflow could be reversed in alternative embodiments.)

Figure 3:
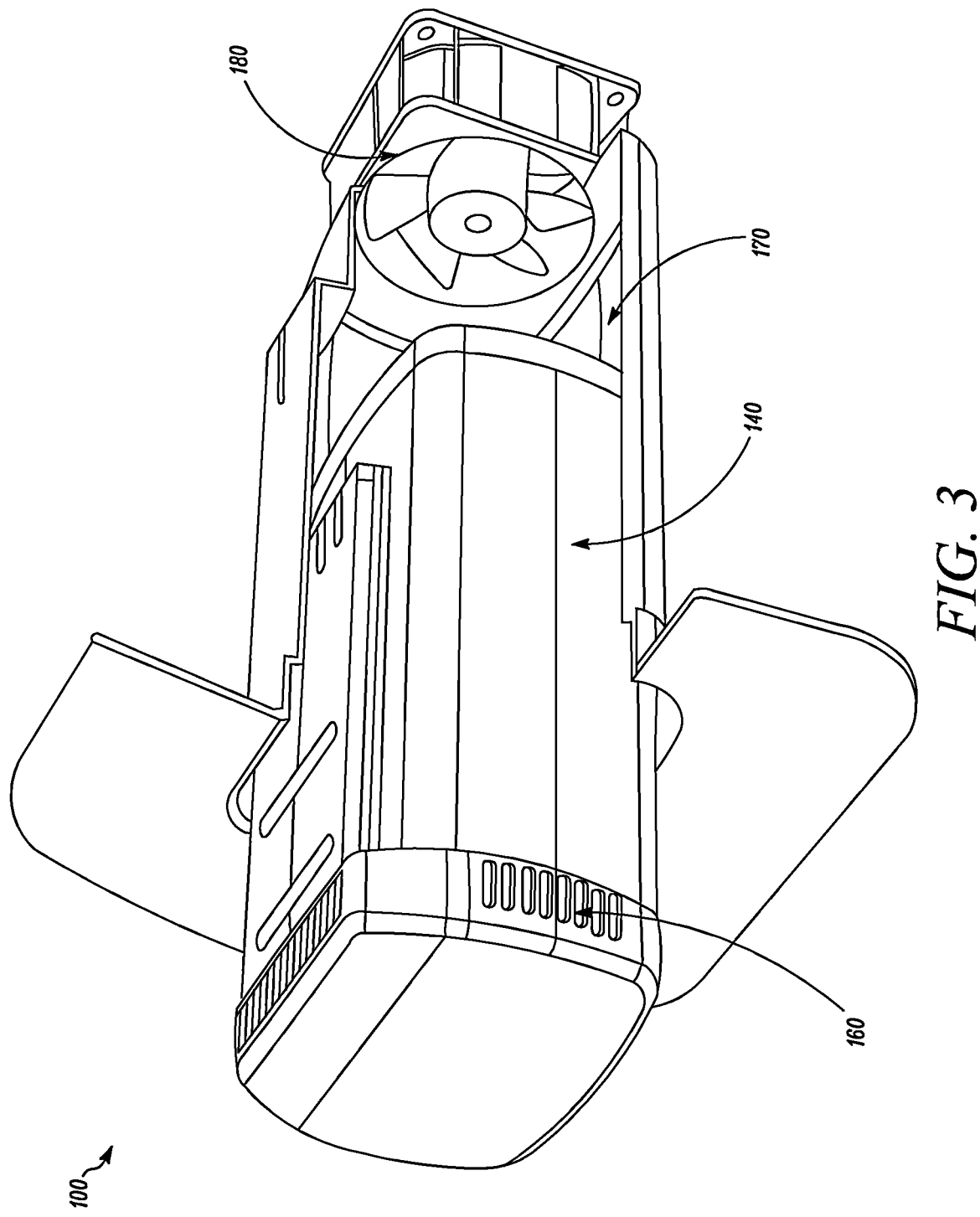
FIG. 3 illustrates an example embodiment in which the battery pack is inserted into a charger cavity of a charging device having a fan associated therewith according to an example embodiment.

In this example, the battery pack 100 may not integrate a fan therein. However, a fan could be integrated, if desired. Rather than include the fan within the battery pack 100, some embodiments may employ an external fan within a battery charging device that may force air through the heat exchanger assembly 130 while the battery pack 100 is being charged. In such an embodiment, the airflow provided to cool the cells may be provided along external surfaces of the cell retainer 110 and through the channels of the heat exchanger assembly 130. FIG. 3 illustrates an example embodiment in which the battery pack 100 is inserted into a charger cavity 170 of a charging device having a fan 180 associated therewith. The charger cavity 170 may be substantially shaped to match the shape of the cover 140 and/or other casing portions of the battery pack 100 so that a relatively tight fit is achieved between the battery pack 100 and the charger cavity 170. Air may then be sucked into the intake vents 160 and out the discharge vents 162 by the fan 180 in order to move the air through the heat exchanger assembly 130. However, it should be appreciated that the fan may instead blow air in the reverse direction in some cases.

The air that is moved through the heat exchanger assembly 130 may provide cooling to the battery pack 100 while the battery pack 100 is being charged. In this regard, the cover 140 or other portions of the casing of the battery pack 100 may include battery contacts that may be in communication with electrical contacts (not shown) of the charger cavity 170 to enable the battery pack 100 to be charged.

Thus, for example, in some embodiments, the cell retainer 110 may define an enclosed mass capable of accumulating and dissipating heat to ambient surroundings via the heat exchanger assembly 130 disposed proximate to an external periphery of the cell retainer 110 during discharge operations sufficient to prevent damage to the cells. However, the heat exchanger assembly 130 may also be used to remove heat from the cell retainer 110 via active thermal rejection processes (i.e., forced air cooling) when during charging operations. As such, the heat exchanger assembly 130 of example embodiments is disposed proximate to the external periphery of the cell retainer 110 that provides for heat accumulation during discharge operations so that the heat exchanger assembly 130 can provide for passive heat removal during discharging (i.e., defining a first mode of operation). However, the heat exchanger assembly 130 also provides for active heat removal (e.g., via forced air flow) during charging operations (i.e., defining a second mode of operation). As such, the heat exchanger assembly 130 sits external (and proximate) to the cell retainer 110 to provide two different modes (e.g., the first and second modes) of operation for heat removal from the battery pack 100 dependent upon the operational condition of the battery pack 100 (i.e., charging or discharging). It should also be appreciated that a third mode of operation may be provided in which the battery pack 100 is neither charging nor discharging, but is instead receiving cooling air flow (e.g., active cooling). Thus, for example, the fan 180 may provide cooling either prior to or after a charging operation. In this regard, for example, if battery pack 100 temperature is increased during a discharge operation to a relatively high temperature, it may be desirable to actively cool the battery pack 100 prior to beginning any charging operation to reduce the temperature of the battery pack 100 prior to engaging in charging operation.

The heat exchanger assembly 130 may be integrated with the cell retainer 110 (e.g., as fins 132 or other structures extending therefrom toward the casing 140), or may be integrated with the casing 140 (e.g., as fins 132 or other structures extending from the casing 140 toward the cell retainer 110). In yet other alternative, the heat exchanger assembly 130 may be separate from the cell retainer 110 and the casing 140. However, in the example embodiment of FIGS. 1-3, the cell retainer 110 remains sealed with respect to the cooling air or fluid. For example, the electrode covers 150 provide a seal with the periphery of the cell retainer 110 so that dirt, debris, moisture and other potential contaminants are not able to access the battery cells within the cell reception slots 120. Thus, the cell reception slots 120 are essentially sealed containers for retaining the battery cells within the cell retainer 110.

In some embodiments, passive heat removal by the heat exchanger assembly 130 during the first mode of operation (e.g., discharge operation) may be accomplished via the extraction of heat from the cell retainer 110. Meanwhile, during the second mode of operation (e.g., charging operation), active heat removal may be accomplished via forced air flow over the same surfaces that remove heat passively during the first mode of operation. In the example of FIGS. 1-3, the heat exchanger assembly 130 may be within the cover 140, and therefore between the cover 140 and the cell retainer 110. However, in other example embodiments, the heat exchanger assembly 130 may include or otherwise be embodied as the cover. In either case, the cell retainer 110 itself is sealed so that even if airflow is enabled to be provided within the casing 140, such airflow and any contaminants that could be therein are not allowed access to internal portions of the cell retainer 110.

Figure 4:
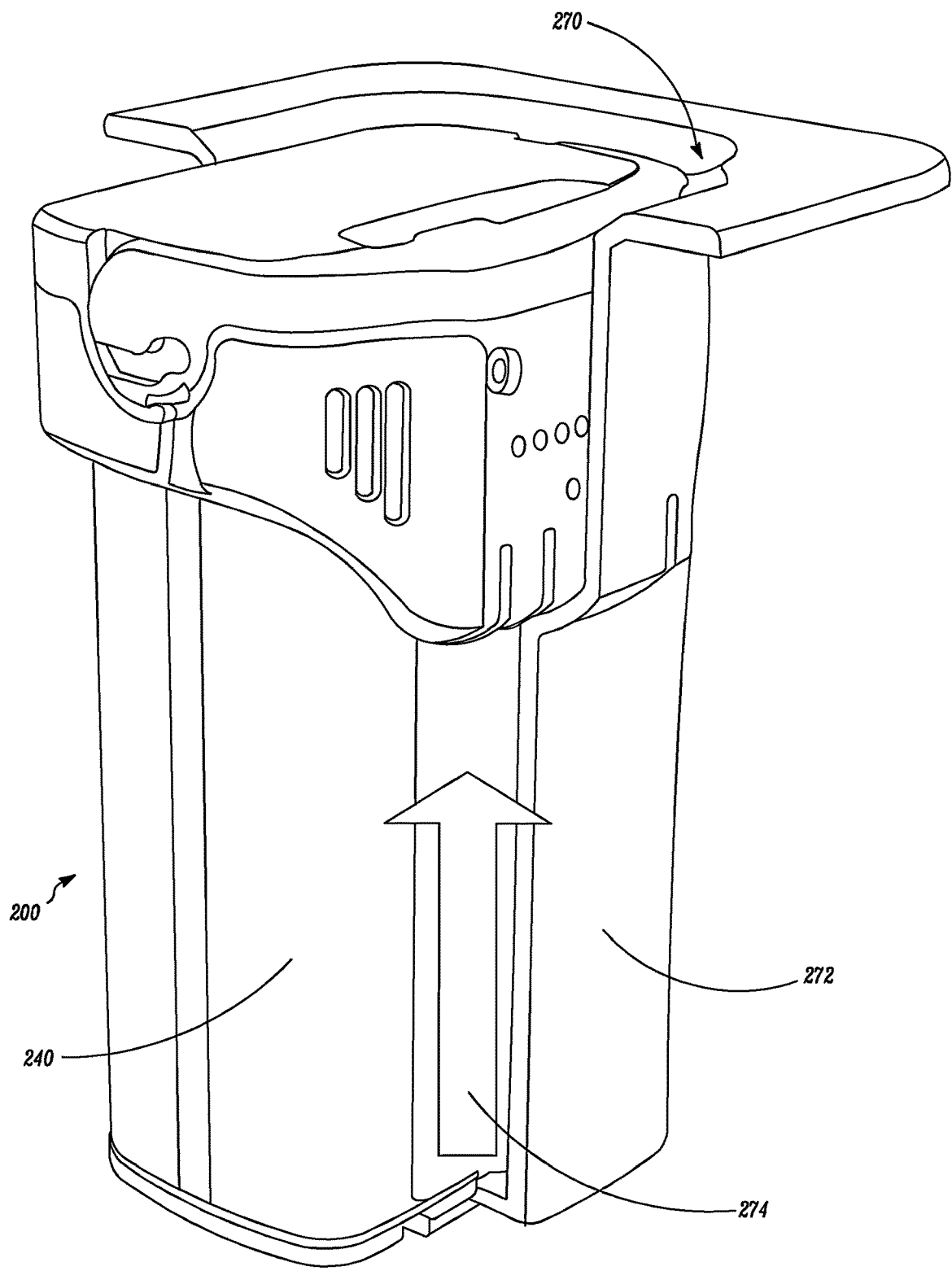
FIG. 4 illustrates a battery pack having a cover that acts as the heat exchanger assembly according to an example embodiment.

FIG. 4 illustrates an example where a battery pack 200, which may be constructed similarly to the battery pack 100 of FIGS. 1-3 except that the battery pack 200 may include a cover 240 that acts as the heat exchanger assembly of this example embodiment. As such, for example, when the battery pack 200 is inserted into charger cavity 270, there may be a space between walls 272 of the charger cavity 270 and the cover 240 of the battery pack 200. Accordingly, when air is driven through the charger cavity 270 between the cover 240 and the walls 272 as shown by arrow 274, the cover 240 (acting as the heat exchanger assembly and in contact with the cell retainer (not shown)) may communicate thermal energy to the air stream passing proximate to the cover 240.

Thus, the embodiment of FIG. 4 is similar to the embodiments of FIGS. 1-3 insofar as the heat exchanger assembly is external to, but also proximate to the cell retainer, and insofar as the cell retainer being sealed so that no cooling flow is provided internal to the cell retainer. However, in the example of FIG. 4, the air flow caused during active heat removal is external to the casing instead of internal to the casing (as shown in FIGS. 1-3), even though the air flow during active heat removal is always external to the cell retainer.

Figure 5:
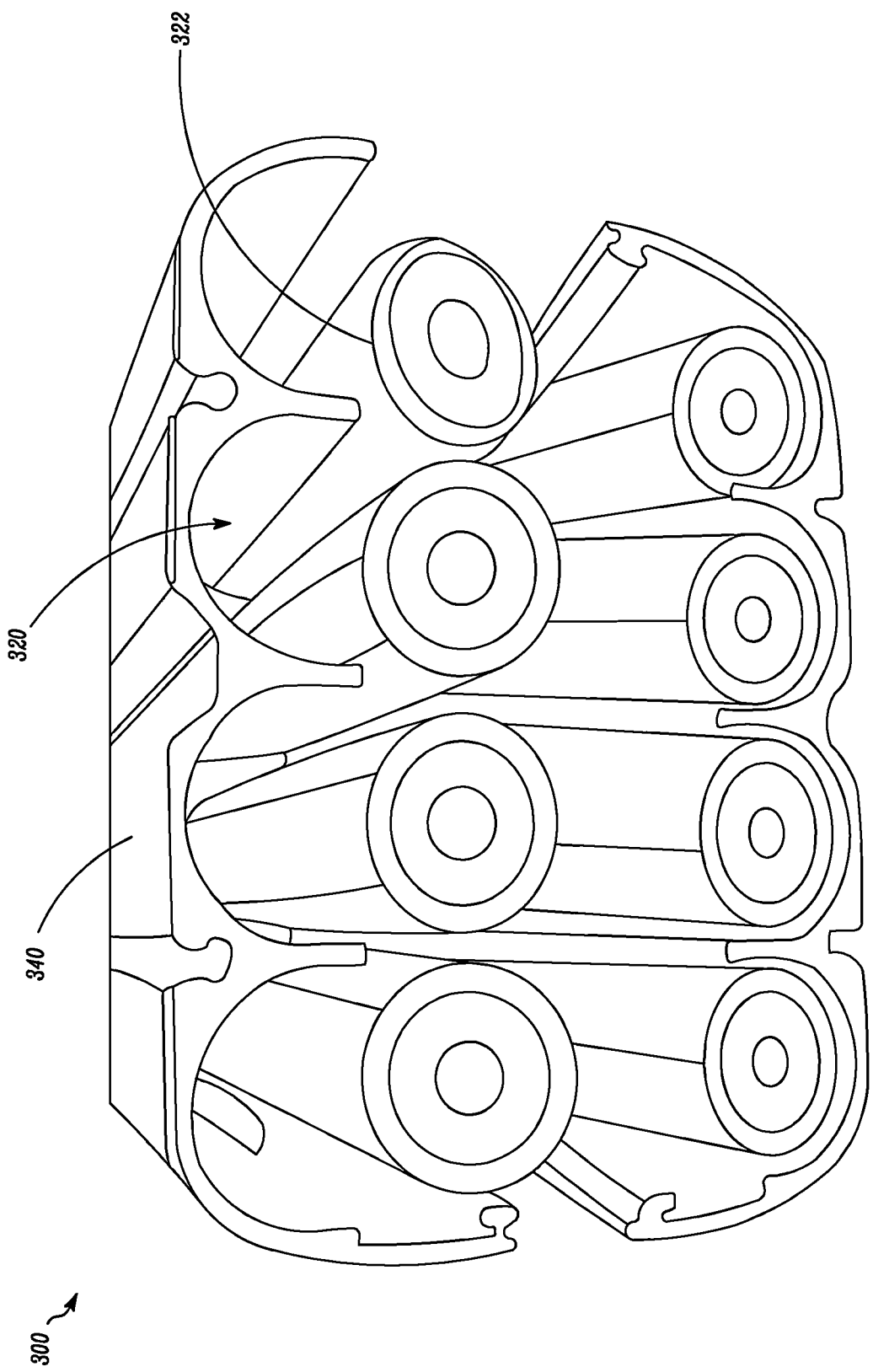
FIG. 5 illustrates a partially exploded perspective view of a portion of a battery pack according to yet another example embodiment.

FIG. 5 illustrates a partially exploded perspective view of a portion of a battery pack 300 according to yet another example embodiment. In the example of FIG. 5, the cell retainer, the heat exchanger assembly and cover 340 are all embodied in a single structure. Thus, for example, the cover 340 is formed to define cell reception slots 320 into which cells 322 are provided. Heat generated by the cells 322 is absorbed in the cover 340 acting as the cell retainer, and then transferred through the cover 340 away from the cells 322 to be released to the air surrounding the battery pack 300. Ends of the cells 322, which may be attached to electrodes and/or control circuitry, may also be sealed within the battery pack 300 to form a closed container that can keep dirt, debris, moisture and other potential contaminants away from the cells 322. During discharge operation, the combination of absorption of heat in the cover 340 and release of heat to the surrounding environment through the cover 340 may be sufficient to keep the battery cells relatively cool. During charging operations, the battery pack 300 may be cooled by passing cooling airflow over the surface of the cover 340. The air passed over the cover 340 may be provided in a similar fashion to that described above for FIGS. 1-4 (i.e., within a charger cavity), or may be passed over the surface of the cover 340 absent the sidewalls of the charger cavity as shown in the example of FIG. 6.

Figure 6:
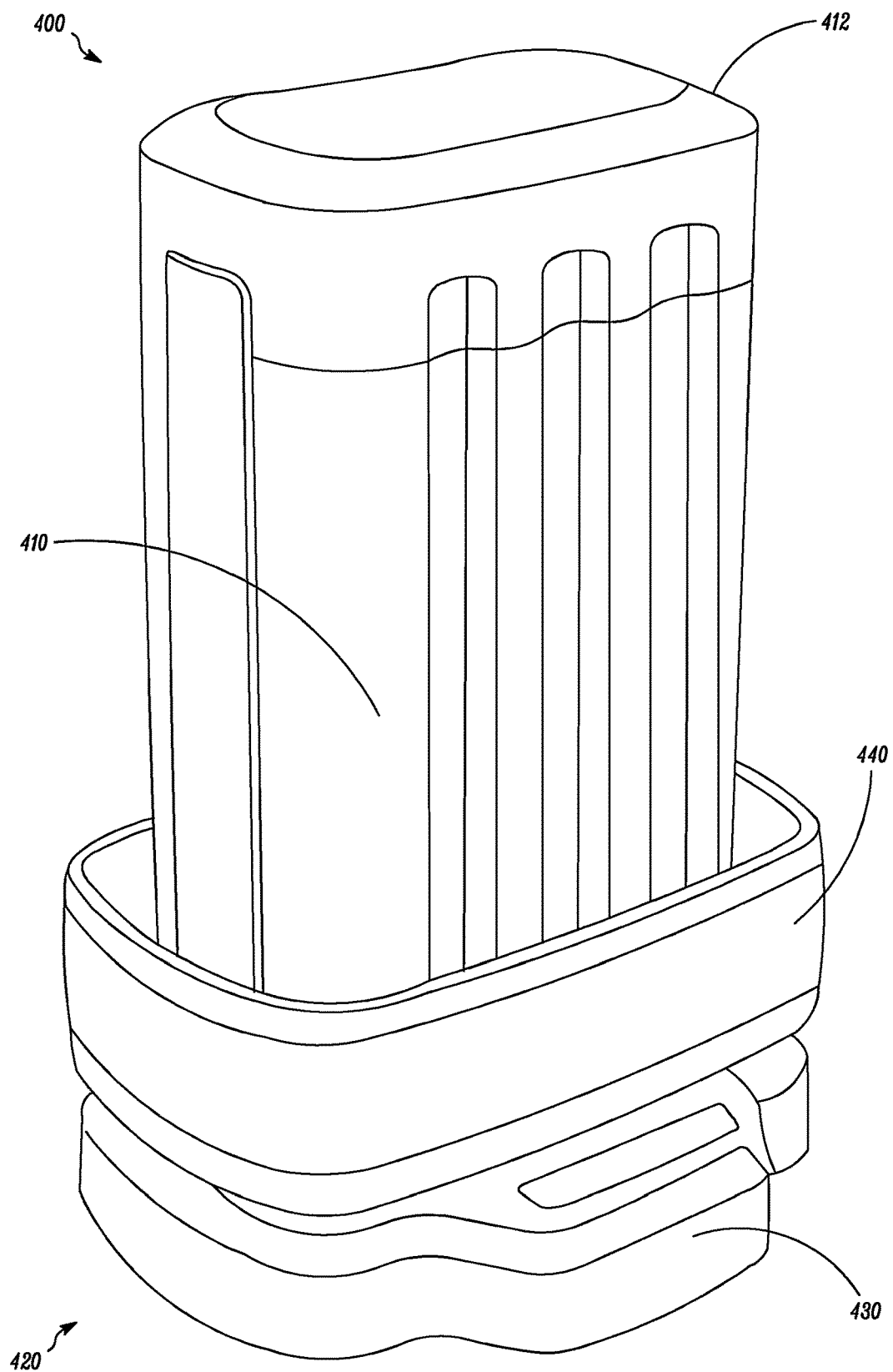
FIG. 6 illustrates a battery pack charging system according to an example embodiment.

FIG. 6 illustrates a battery pack 400 that may be an example of any of the battery packs previously described. Thus, for example, the battery pack 400 may employ a cell retainer that is in contact with an adjoining heat exchanger assembly that is in contact with the cover 410. Alternatively, the cell retainer may be the same unitary piece of material as the heat exchanger assembly, but may be external to the cell retainer in order to pass thermal energy on to the cover 410. As yet another alternative, the cover 410 and the heat exchanger assembly may be the same unitary piece of material. In yet one more alternative, the cover, the heat exchanger assembly and the cell retainer may all be part of the same unitary piece of material and/or may be embodied in a single structure (e.g., similar to the example of FIG. 5). In any case, the example of FIG. 6 may be designed such that the battery pack 400 is completely enclosed so that no airflow or other matter is enabled to enter inside the cover 410. Thus, end cap 412 may seal the battery cells within the battery pack at one end, and another end cap (not shown) may seal the opposite end and include electrical contacts for providing electrical communication with the charger 420 for charging the battery pack 400.

The charger 420 may include charging electronics disposed within base 430. In an example embodiment, one of the longitudinal ends of the battery pack 400 may be inserted into the charger 420. Accordingly, the battery pack 400 may act as a cooling tower by virtue of the vertical orientation of the sides of the cover 410. Heat may be rejected naturally from the cover 410 and rise upward by normal convection. Thus, in some embodiments, natural cooling of the battery pack 400 may be enhanced by vertical orientation of the battery pack 400 within the charger to create maximum exposure of the cover 410 to ambient air surrounding the charger 420 and the battery pack 400.

In some embodiments, the base 430 may be further provided with a fan disposed therein and oriented to blow air upward. In such an embodiment, airflow from the fan within the base 430 may be oriented upward around the longitudinal end of the battery pack 400 and directed by a flow guide 440 upward along the long aspect of the surface of the cover 410. The flow guide 440 may be provided on the base 430 and may be spaced apart from the battery pack 400 to provide a path for airflow between lower portions of the cover 410 and the flow guide 440. The flow guide 440 may direct airflow from the fan upward along sides of the battery pack 400 to enhance the natural cooling effects described above. Thus, although the flow guide 440 does not need to extend all the way along a length of the cover 410, the flow guide 440 may effectively direct airflow substantially along a surface of the cover 410 to remove heat from the cover 410 when the battery pack 400 is being charged.

Although forced airflow is not required, the provision of air directed upward along sides of the cover 410 may further facilitate heat removal from the battery pack 400 through thermal convection generated by heat at the surface of the cover 410 being carried away from the surface by the cooling air provided. Thus, a combination of natural convection and forced convection may facilitate cooling of the battery pack 400. In some embodiments, the fan provided in the base 430 may have vanes or other airflow directing structures to symmetrically provide airflow along all sides of the battery pack 400.

Although, this example embodiment shows the battery pack 400 inserted into the charger 420 at one of the longitudinal ends of the battery pack 400, it should be appreciated that some example embodiments may alternatively orient the battery pack 400 in other directions. When forced airflow becomes a dominant factor in the cooling of the battery pack 400, the orientation of the battery pack 400 may be less important. Thus, vertical orientation of the battery pack 400 as shown in FIG. 6 may allow less forced cooling air to be provided (e.g., with a lower power fan) in order to achieve the same amount of cooling due to the contribution of natural convection facilitated by exposing the long surfaces of the cover 410 to enable heat to efficient emanate therefrom. However, if provision of more forced cooling air is not a design concern, then any orientation of the battery pack 400 may be provided.

The charger 420, since it only includes the flow guide 440 instead of a full charger cavity (like the examples of FIGS. 3 and 4), has a much lower profile and can be stored while taking up less space. The charger 420 may also be more compact for easier transport with less likelihood of damage thereto. In this regard, having a relatively low profile may enable the charger 420 to be made relatively robustly with less weight, while also making it more resilient to impact. Meanwhile, the flow guide 440 may still provide effective cooling flow sufficient to cool the battery pack 400 before and/or during charging operations while still enabling the battery pack 400 to be sealed to prevent exposure of battery internals to contaminants.

Figure 8:
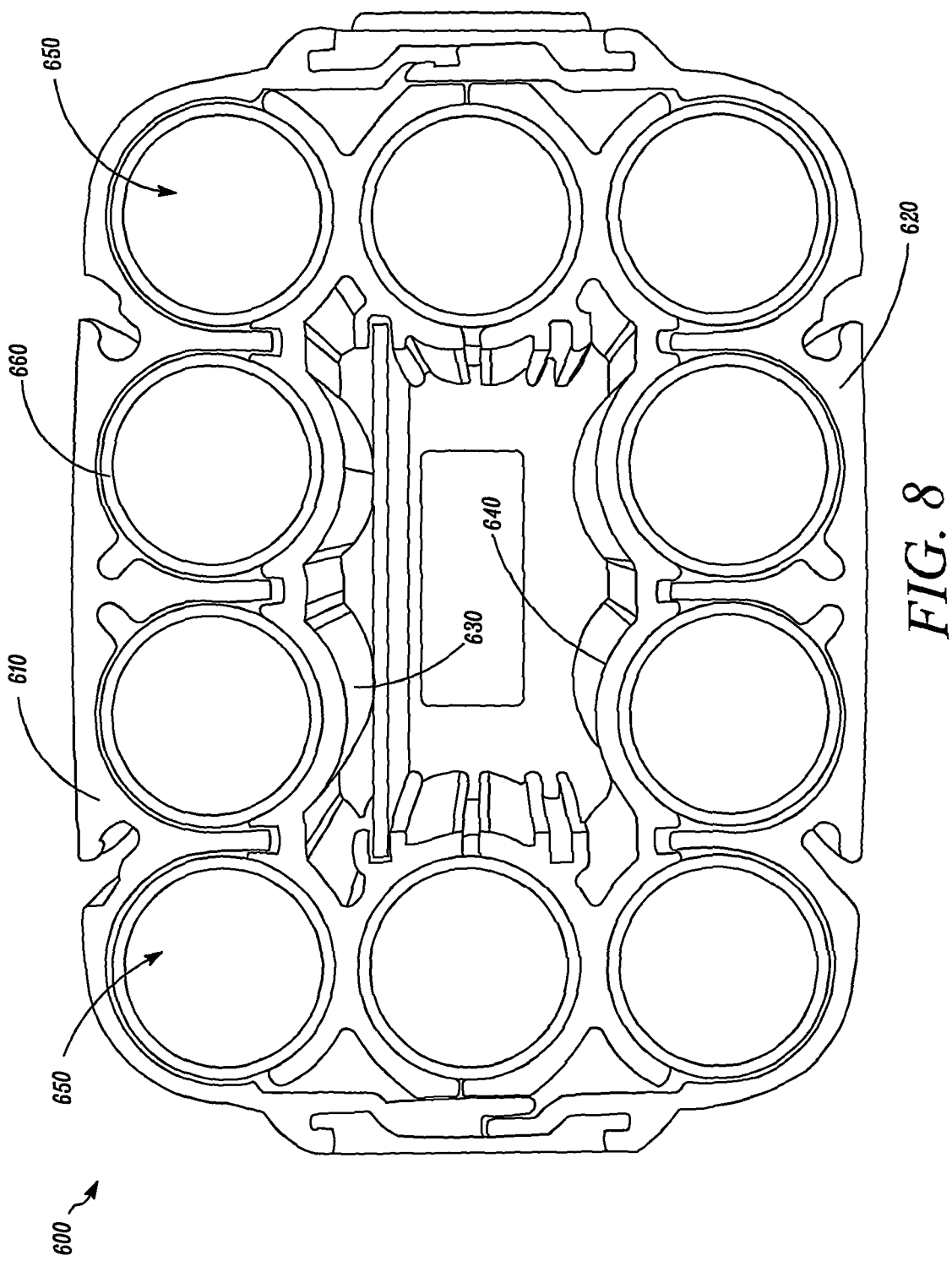
FIG. 8 illustrates a top view of a cell retainer that forms an assembly of component parts according to an example embodiment.

As can be appreciated from the example embodiments above, some embodiments may provide a battery pack including a plurality of battery cells, a cell retainer and a heat exchanger assembly. The cell retainer may define a plurality of cell reception slots configured to retain respective ones of the battery cells. The cell retainer may define an enclosure around the battery cells that is not penetrated by any cooling apparatus (i.e., no cooling pipes, air channels and/or the like are provided within the periphery of the cell retainer). Of note, the enclosure is not necessarily formed from a unitary piece of material. Indeed, in some embodiments, the enclosure may be formed of a plurality of separate parts or components that may be fitted together. Moreover, the parts or components may or may not necessarily be fixed to one another. Thus, in some cases, the parts or components may be adhered to each other via welding, screws, snap fittings, or other forms of adhesion. However, in other examples, the parts or components may simply be held together by one or more straps, casings, or other components, but otherwise not necessarily be adhered to each other. As an example, FIG. 8 illustrates a top view of one example cell retainer 600 that forms an assembly of component parts including a first exterior shell portion 610 and a second exterior shell portion 620. The first exterior shell portion 610 and the second exterior shell portion 620 may be disposed around respective ones of a first interior portion 630 and a second interior portion 640 to define cavities 650 into which the battery cells may be provided. Of course, in other embodiments, the cell retainer may be provided as a continuous peripheral enclosure that completely surrounds all of the battery cells. When made of multiple parts, the cell retainer parts may be disposed adjacent to each other to form the enclosure such that spaces are provided between at least some of the parts to account for thermal expansion of the cell retainer and/or of cells. In this regard, either cells or the cell retainer may have dimensional variations due to production tolerances or responses to external factors such as, for example, thermal expansion/contraction. Furthermore, in some cases, the cell retainer 600 may include a thermal interface material 660 disposed in the cell reception slots between the battery cells and the cell retainer 600. In an example embodiment, the cell retainer 600 may further include one or more reception cavities encapsulating a phase change material. The reception cavities may form ducts, holes or other spaces within the cell retainer 600 to include phase change material such as wax. The phase change material may further increase the capacity of the cell retainer to absorb heat.

The cell retainer may be in thermal communication with the battery cells to transfer heat away from the battery cells. The heat exchanger assembly may be in thermal communication with the cell retainer to at least passively transfer heat away from the cell retainer while the battery pack is operated in a discharge mode. The cell retainer may include a thermally conductive material capable of transferring heat to the heat exchanger assembly and also storing at least some of the heat. In embodiments where the cell retainer and the heat exchanger assembly are formed of the same unitary material, the cell retainer may be embodied as inner portions of the cell retainer that contact the cells, and the heat exchanger assembly may be embodied as outwardly oriented portions of the structure (i.e., fins and/or outer lateral surfaces of the structure).

In some cases, modifications or amplifications may further be employed including (1), the heat exchanger assembly may support passive cooling only while the battery pack is operated in a discharge mode and supports active cooling while the battery pack is being charged. In connection with example (1), the cell reception slots may be disposed parallel to each other along a first direction, and the active cooling may be provided via air flow provided proximate to the heat exchanger assembly such that the air flow is directed parallel to the first direction.

In an example embodiment (2), the battery pack may further include a cover disposed to contain the cell retainer and the heat exchanger assembly. In some cases, the heat exchanger assembly may include a plurality of fins extending between a surface of the cell retainer and the cover. In some embodiments, the cell retainer and the heat exchanger assembly are formed from a single unitary piece of material. Alternatively, the cover and the heat exchanger assembly may be formed from a single unitary piece of material.

In another example (3), the heat exchanger assembly may include at least an external surface of lateral sides of the battery pack. In some cases, the heat exchanger assembly extends parallel to at least a portion of a sidewall of a charger cavity into which the battery pack is insertable for charging.

In an example embodiment, none, any or all of modifications/amplifications (1) to (3) may be employed either by themselves or in combination with each other. Moreover, in some cases, none, any or all of modifications/amplifications (1) to (3) may be employed and the heat exchanger assembly may receive a forced flow of air from a fan of a battery charger while the battery pack is being charged, and passively transmit heat to an environment of the battery pack while the battery pack is being discharged. In an example embodiment, none, any or all of modifications/amplifications (1) to (3) may be employed and the cell retainer may include a metallic or thermally conductive plastic enclosure disposed around all lateral sides of the battery cells while longitudinal ends of the cell retainer are sealed.

In an example embodiment, none, any or all of modifications/amplifications (1) to (3) may be employed either by themselves or in combination with each other in the context of a battery pack charging system that includes the battery pack described above and a battery charger configured to receive the battery pack for charging thereof. The battery pack charging system may include (4) a modification such that the heat exchanger assembly may include at least an external surface of lateral sides of the battery pack. In some cases, the heat exchanger assembly extends parallel to at least a portion of a sidewall of a charger cavity into which the battery pack is insertable for charging. In an example embodiment, the battery charger may further include a fan disposed therein. The fan may be configured to operate to force air between the sidewall of the charger cavity and the heat exchanger assembly.

In some embodiments, none, any or all of modifications/amplifications (1) to (4) may be employed and the battery charger may be configured to receive one longitudinal end of the battery pack. In such an embodiment, the battery charger may further include a fan disposed therein and configured to operate to force air along the external surface of all lateral sides of the heat exchanger assembly. The battery charger may include a base on which the one longitudinal end of the battery pack is supported. The fan may be disposed in the base, and the base may support a flow guide extending around a periphery of the battery pack proximate to the one longitudinal end of the battery pack. The flow guide may leave a majority portion of lateral sides of the battery pack exposed. In an example embodiment, the battery charger may be configured to receive one end of the battery pack such that a longitudinal centerline of the battery pack is arranged vertically relative to the battery charger when the battery pack is received into the battery charger for charging of the battery pack. In some embodiments, none, any or all of modifications/amplifications (1) to (4) may be employed and the cell retainer may include a plurality of parts disposed adjacent to each other to form the continuous peripheral enclosure. In an example embodiment, none, any or all of modifications/amplifications (1) to (4) may be employed and the cell retainer may include a plurality of parts disposed adjacent to each other to form the enclosure such that spaces are provided between at least some of the parts to account for thermal expansion of the cell retainer. In some embodiments, none, any or all of modifications/amplifications (1) to (4) may be employed and the cell retainer may include a thermal interface material disposed in the cell reception slots between the battery cells and the cell retainer. In an example embodiment, none, any or all of modifications/amplifications (1) to (4) may be employed and the cell retainer may include one or more reception cavities encapsulating a phase change material.

Figure 7:
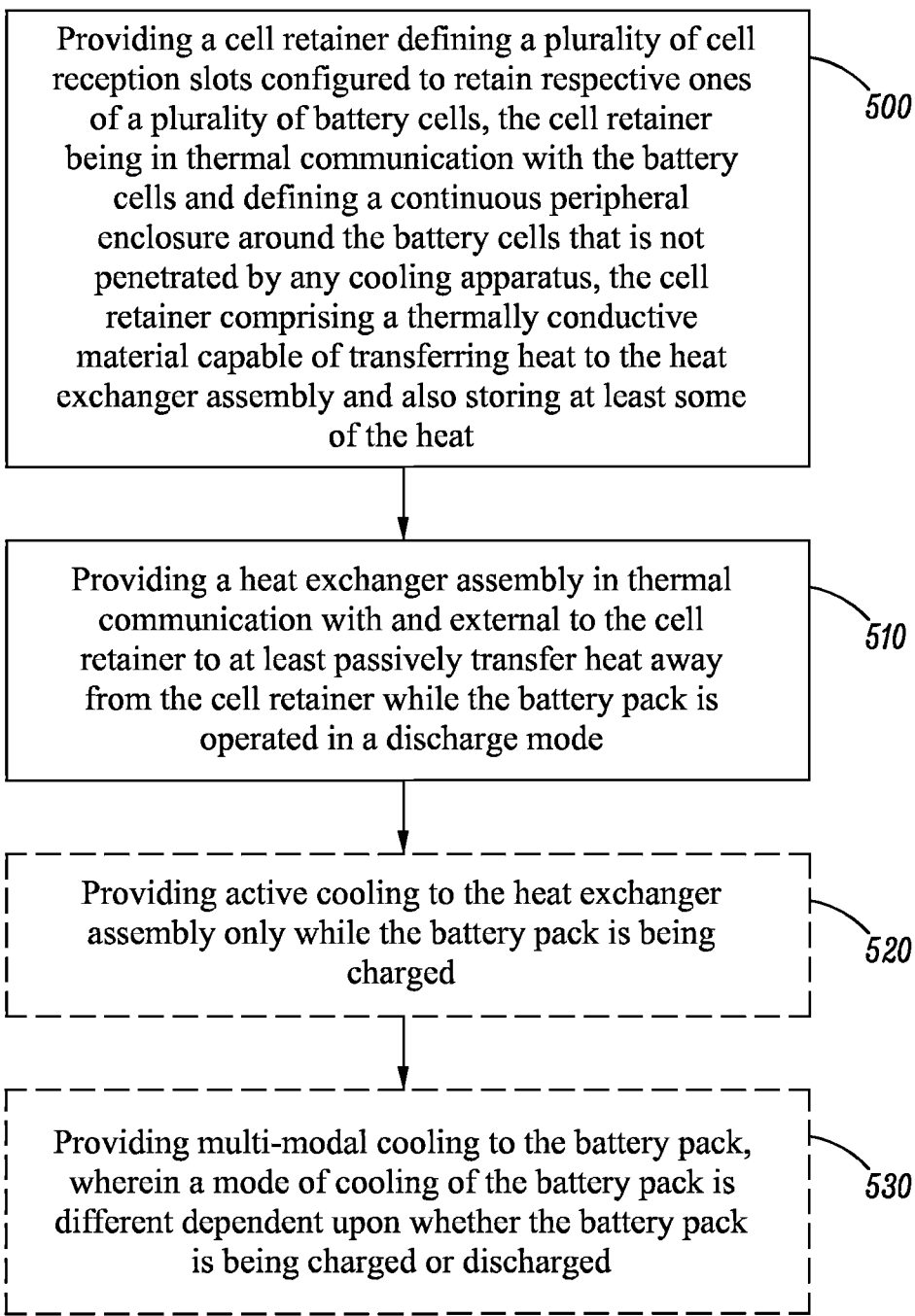
FIG. 7 illustrates a method of providing cooling to a battery pack in accordance with an example embodiment.

FIG. 7 illustrates a method of providing cooling to a battery pack in accordance with an example embodiment. It should be appreciated that some embodiments of the invention may make cooling a battery pack easier when several cells or groups of cells need to be employed. In this regard, a method of providing cooling to a battery pack may include providing a cell retainer defining a plurality of cell reception slots configured to retain respective ones of a plurality of battery cells at operation 500. The cell retainer may be in thermal communication with the battery cells and may define a continuous peripheral enclosure around the battery cells that is not penetrated by any cooling apparatus. The cell retainer may include a thermally conductive material capable of transferring heat to the heat exchanger assembly and also storing at least some of the heat. In an example embodiment, the method may further include providing a heat exchanger assembly in thermal communication with and external to the cell retainer to at least passively transfer heat away from the cell retainer while the battery pack is operated in a discharge mode at operation 510.

In some embodiments, the operations above may be modified or amplified, and/or additional operations may be included in the method. For example, in some cases, the method may further include providing active cooling to the heat exchanger assembly only while the battery pack is being charged at operation 520. Alternatively or additionally, the method may further include providing multi-modal cooling to the battery pack, wherein a mode of cooling of the battery pack is different dependent upon whether the battery pack is being charged or discharged at operation 530.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A battery pack comprising:
   a plurality of battery cells;
   a cell retainer defining a plurality of cell reception slots configured to retain respective ones of the battery cells, each cell reception slot of the cell retainer being individually sealed the cell retainer being in thermal communication with the battery cells to transfer heat away from the battery cells;
   a heat exchanger assembly disposed external to the cell retainer, the heat exchanger assembly being in thermal communication with the cell retainer to at least passively transfer heat away from the cell retainer, the heat exchanger assembly being disposed at least partially between portions of the cell reception slots; and
   a cover, the cover comprising an external surface of the battery pack,
   wherein each of the plurality of cell reception slots extends along an entire length of the respective battery cell being retained by the cell reception slot,
   wherein a single structure comprises the cell retainer and the heat exchanger assembly, and
   wherein the single structure comprises a thermally conductive material configured to transfer some of the heat away from the battery cells and store at least some of the heat.

2. The battery pack of claim 1, wherein the heat exchanger assembly supports passive cooling only while the battery pack is operated in a discharge mode and supports active cooling while the battery pack is being charged.

3. The battery pack of claim 2, wherein the cell reception slots are disposed parallel to each other along a first direction, and wherein the active cooling is provided via air flow provided proximate to the heat exchanger assembly such that the air flow is directed parallel to the first direction.

4. The battery pack of claim 1, wherein the cell retainer and the heat exchanger assembly are formed from a single unitary piece of metallic material.

5. The battery pack of claim 1, wherein the heat exchanger assembly and the cover are formed from a single unitary piece of metallic material.

6. The battery pack of claim 1, wherein the heat exchanger assembly comprises at least an external surface of lateral sides of the battery pack.

7. The battery pack of claim 6, wherein the heat exchanger assembly extends parallel to at least a portion of a sidewall of a charger cavity into which the battery pack is insertable for charging.

8. The battery pack of claim 1, wherein the heat exchanger assembly receives a forced flow of air from a fan of a battery charger while the battery pack is being charged, and passively transmits heat to an environment of the battery pack while the battery pack is being discharged.

9. The battery pack of claim 1, wherein the cell retainer comprises a metallic or thermally conductive plastic enclosure disposed around all lateral sides of the battery cells, and wherein longitudinal ends of the cell retainer are sealed.

10. The battery pack of claim 1, wherein the cell retainer comprises a plurality of parts disposed adjacent to each other and integrated with each other to form the continuous peripheral enclosure.

11. The battery pack of claim 1, wherein the cell retainer comprises a plurality of parts disposed adjacent to each other and integrated with each other to form the enclosure, and wherein spaces are provided between at least some of the parts to account for thermal expansion or contraction of the cell retainer or the battery cells.

12. The battery pack of claim 1, wherein the cell retainer comprises a thermal interface material disposed in the cell reception slots between the battery cells and the cell retainer.

13. The battery pack of claim 1, wherein the cell retainer comprises one or more reception cavities encapsulating a phase change material.

14. The battery pack of claim 1, wherein the single structure is a unitary piece of metal.

15. The battery pack of claim 1, wherein the heat exchanger assembly comprises a plurality of fins wherein at least some of the fins are disposed between the portions of the some of the battery cells and the corresponding portions of the cell reception slots.

16. A battery pack comprising:
a plurality of battery cells;
a cell retainer defining a plurality of cell reception slots configured to retain respective ones of the battery cells, each cell reception slot of the cell retainer being individually sealed, the cell retainer being in thermal communication with the battery cells to transfer heat away from the battery cells;
a heat exchanger assembly disposed external to the cell retainer, the heat exchanger assembly being in thermal communication with the cell retainer to at least passively transfer heat away from the cell retainer, the heat exchanger assembly being disposed at least partially between portions of some of the cell reception slots; and
a cover, the cover comprising an external surface of the battery pack,
wherein a single structure comprises the cell retainer and the heat exchanger assembly,
wherein the single structure comprises a thermally conductive material configured to transfer some of the heat away from the battery cells and store at least some of the heat,
wherein the heat exchanger assembly comprises a plurality of fins, each fin of the plurality of fins being proximate at least one other of the fins and each fin extending between an outer surface of the cell retainer and an inner surface of the cover parallel to a length of the cell retainer, and
wherein each of the plurality of fins is configured to carry the heat away from the cell retainer.

17. The battery pack of claim 16, wherein each of the plurality of cell reception slots extends along a length of the respective battery cell being retained by the cell reception slot.

18. A battery pack comprising:
a plurality of battery cells;
a cell retainer defining a plurality of cell reception slots configured to retain respective ones of the battery cells, each cell reception slot of the cell retainer being individually sealed within the battery pack, the cell retainer being in thermal communication with the battery cells to transfer heat away from the battery cells;
a heat exchanger assembly disposed external to the cell retainer, the heat exchanger assembly being in thermal communication with the cell retainer to at least passively transfer heat away from the cell retainer, the heat exchanger assembly being disposed at least partially between portions of the cell reception slots; and
a cover, the cover comprising an external surface of the battery pack,
wherein each of the plurality of cell reception slots extends along a length of the respective battery cell being retained by the cell reception slot,
wherein a single structure comprises the cell retainer and the heat exchanger assembly,
wherein the single structure comprises a thermally conductive material configured to transfer some of the heat away from the battery cells and store at least some of the heat,
wherein the heat exchanger assembly comprises a plurality of fins, each fin of the plurality of fins being proximate at least one other of the fins and each fin extending between an outer surface of the cell retainer and an inner surface the cover along a length of the cell retainer, and
wherein each of the plurality of fins is configured to carry the heat away from the cell retainer.

19. The battery pack of claim 18, wherein each fin is a plate, and wherein the plurality of fins are parallel are to each other.

* * * * *